United States Patent
Robert et al.

(10) Patent No.: US 7,997,128 B2
(45) Date of Patent: Aug. 16, 2011

(54) TACHOMETER FOR TIRES

(75) Inventors: Michel Robert, Cellule (FR); Bernard Perrier, Clemont-Ferrand (FR); Christian Jeandey, Saint-Egreve (FR)

(73) Assignees: Michelin Recherche et Technique S.A., Granges-Paccot (CH); Commissariat a l Energie Atomique et aux Energies Alternatives, Paris (FR)

( * ) Notice: Subject to any disclaimer, the term of this patent is extended or adjusted under 35 U.S.C. 154(b) by 798 days.

(21) Appl. No.: 11/587,563

(22) PCT Filed: Apr. 25, 2005

(86) PCT No.: PCT/EP2005/051831
§ 371 (c)(1),
(2), (4) Date: Feb. 7, 2008

(87) PCT Pub. No.: WO2005/103626
PCT Pub. Date: Nov. 3, 2005

(65) Prior Publication Data
US 2008/0251172 A1    Oct. 16, 2008

(30) Foreign Application Priority Data
Apr. 26, 2004  (FR) ...................................... 0 404413

(51) Int. Cl.
*G01M 17/02*  (2006.01)
(52) U.S. Cl. ....................................................... 73/146
(58) Field of Classification Search ........................ None
See application file for complete search history.

(56) References Cited

U.S. PATENT DOCUMENTS

| | | | |
|---|---|---|---|
| 4,339,713 A * | 7/1982 | Kago et al. .................... | 324/173 |
| 4,862,486 A | 8/1989 | Wing et al. | |
| 5,502,433 A | 3/1996 | Breuer et al. | |
| 5,814,725 A * | 9/1998 | Furuichi et al. ............ | 73/146.5 |
| 5,877,679 A | 3/1999 | Prottey | |
| 6,104,975 A | 8/2000 | Matsuo | |
| 6,438,193 B1 | 8/2002 | Ko et al. | |
| 6,539,806 B2 * | 4/2003 | Wright ........................... | 73/703 |

(Continued)

FOREIGN PATENT DOCUMENTS

| | | |
|---|---|---|
| CN | 1395081 | 2/2003 |
| DE | 39 37 966 A1 | 5/1991 |
| EP | 0829 382 A | 3/1998 |
| GB | 2 242 527 A | 10/1991 |
| JP | 11-134600 | 5/1999 |
| JP | 2006027403 A * | 2/2006 |

*Primary Examiner* — Lisa M Caputo
*Assistant Examiner* — Jermaine Jenkins
(74) *Attorney, Agent, or Firm* — Cohen Pontani Lieberman & Pavane LLP (57) ABSTRACT

A device for counting the rotations of a tire on a vehicle using the deformations that the tire undergoes on each rotation of the wheel, comprising a casing, a sensor intended to generate an electrical signal on each rotation of the wheel, and connection means intended to mechanically connect the casing and the sensor to the surface of the tire. The sensor is in the form of a passive sensor in one piece with the casing, whereof the signals emitted are in proportion with the variations over time in a magnetic flux through the said passive sensor, and a magnetic field generator is arranged opposite the passive sensor. The connection means mechanically connect the casing to a first surface A and the magnetic field generator to a second surface B, the two surfaces A and B being substantially coplanar and offset from one another in a direction D by a given distance L. The electrical signal is produced by the relative displacements of the said passive sensor and the said magnetic field generator.

48 Claims, 5 Drawing Sheets

U.S. PATENT DOCUMENTS

| | | | |
|---|---|---|---|
| 6,714,858 B2 * | 3/2004 | Oblizajek et al. | 701/124 |
| 6,763,288 B2 * | 7/2004 | Caretta et al. | 701/1 |
| 6,880,405 B2 * | 4/2005 | Mouhebaty et al. | 73/723 |
| 7,360,411 B2 * | 4/2008 | Beranger et al. | 73/146 |
| 7,379,800 B2 * | 5/2008 | Breed | 701/29 |
| 7,446,525 B2 * | 11/2008 | Pullini | 324/207.26 |
| 7,583,077 B2 * | 9/2009 | Pullini | 324/207.11 |
| 7,760,080 B2 * | 7/2010 | Breed et al. | 340/447 |
| 7,882,732 B2 * | 2/2011 | Haralampu et al. | 73/146.5 |

* cited by examiner

TACHOMETER FOR TIRES

RELATED APPLICATIONS

This is a U.S. national stage of application No. PCT/EP2005/051831, filed on 25 Apr. 2005.

FIELD OF THE INVENTION

The present invention relates to a device intended to be carried by a tire, for detecting the revolutions thereof as it travels. It also relates to a tire carrying a device of this kind.

BACKGROUND OF THE INVENTION

An automotive vehicle generally has an odometer allowing the total distance that this vehicle has covered to be known. However, this counter provides no information on the distance covered by each tire of the vehicle.

For example, when tires are changed temporarily (for example in winter, when snow tires are put on) or when old worn-out tires are replaced, the distance displayed by the odometer no longer indicates the distance actually covered by the tires.

Conventionally, the only indication of the distance covered by a worn tire is thus the wear to its tread.

Tire manufacturers have thus had the idea of inserting a device which is one piece with the tire and inside the latter and which indicates the distance covered by this tire. Such devices already exist.

Of these devices, U.S. Pat. No. 5,877,679 discloses a device for counting the rotations of a tire on a vehicle, comprising a rigid casing, connection means intended to connect the casing mechanically to the inner surface of the tire, and a sensor intended to generate an electrical signal on each rotation of the wheel, in which the connection means comprise at least two mounting blocks which are offset from one another and the sensor is a force sensor arranged between the two mounting blocks.

The existing devices have a limited service life, however, since they have a high level of power consumption and are complex.

SUMMARY OF THE INVENTION

The invention relates to a similar device in which the sensor is in the form of a magnetic field generator and a sensor sensitive to the magnetic field and in one piece with the casing, arranged opposite the passive sensor, in that the connection means mechanically connect the casing to a first surface A and the magnetic field generator to a second surface B, the two surfaces A and B being substantially coplanar and offset from one another in a direction D by a given distance L, and in that the said electrical signal is produced by the relative displacements of the said passive sensor and the said magnetic field generator.

Preferably, the sensor sensitive to the magnetic field is a passive sensor.

This device is simpler than the existing devices and so more robust.

The sensor of the device, unlike the force sensor of the prior art, has no need of power in order to work. This allows the device of the invention to have greater autonomy than existing devices.

Optionally, the passive sensor of the device according to the invention may be a simple loop of conductive wire. In this case, electrical tension is created in the loop by induction when it is subjected to a variation in magnetic flux over time.

One advantage of this coil is its great robustness. Unlike the force sensors or other sensors used previously in the prior art, which are complex and fragile sensors, a simple coil of conductive wire has a high resistance to the vibrations created by travel over the ground.

According to a first preferred embodiment, the connection means are such that a relative displacement normal to the direction D of the surfaces A and B brings about a relative displacement of the magnetic field generator and the sensor sensitive to the magnetic field substantially normal to the direction D.

The magnetic field generator and the sensor sensitive to the magnetic field may be arranged in opposition in a direction normal to the direction D.

According to a first example embodiment, the connection means, the casing and the sensor sensitive to the magnetic field may advantageously be arranged in an L shape.

The means for connecting the casing and the sensor may also comprise a flexible soleplate having a first face intended to be permanently connected to the surface of the tire and at least one connection element to which the casing is fixed at a given spacing in relation to the soleplate.

The magnetic field generator is in this case advantageously embedded in the soleplate.

Preferably, the casing, the element for connecting the casing and the soleplate are generally U-shaped.

According to a second example embodiment, the means for connecting the magnetic field generator are in the form of a resilient connection element of arcuate elongate shape extending in the direction D between the surface B and a zone of the casing or element for connecting the casing which is opposite the surface A, the magnetic field generator and the sensor sensitive to the magnetic field being arranged in opposition between the two ends of the said element for connecting the sensor.

Preferably, the connection means comprise a flexible soleplate connecting the surfaces A and B.

This device has the advantage of allowing the surfaces A and B to be separated from one another and thus to increase the amplitude of relative movements between the two elements of the sensor.

According to a third example embodiment, the means for connecting the magnetic field generator are in the form of a resilient connection element of arcuate elongate shape extending in the direction D between the surface B and a surface B' arranged beyond the surface A, the magnetic field generator and the sensor sensitive to the magnetic field being arranged in opposition between the two ends of the said element for connecting the magnetic field generator.

Preferably, the connection means comprise a flexible soleplate connecting the surfaces A, B and B'.

This device makes it possible in certain conditions, for example when it is arranged on the inner surface of the tire below the crown, to make the device for counting the rotations of the tire more sensitive. The device is in this case preferably arranged with the direction D oriented in the circumferential direction. It is also possible to arrange this device on the surface of the sidewall, with the orientation still in the circumferential direction.

The magnetic field generator and the sensor sensitive to the magnetic field may also be arranged in opposition in a direction parallel to the direction D.

According to a fourth example embodiment, the connection means comprise an element for connecting the casing separating the said casing from the surface A by a given height and an element connecting the magnetic field generator separating the said magnetic field generator from the surface B by a given height, and in which the sensor sensitive to the magnetic field is in one piece with the casing and is arranged at a height in relation to the surface A which is substantially identical to the height separating the magnetic field generator from the surface B.

A device of this kind may preferably be arranged close to the beads of the tire with a radial orientation D.

According to a second embodiment, the connection means are such that a relative displacement normal to the direction D of the surfaces A and B brings about a relative displacement of the sensor sensitive to the magnetic field and the magnetic field generator substantially parallel to the direction D.

According to a fifth example embodiment which corresponds to this second embodiment, the means for connecting the magnetic field generator may comprise two elongate arms with a connection point in an L shape, such that the generator is arranged substantially at the said connection point, the first arm extends from the connection point to an adjoining zone substantially on the surface A and the second arm extends from the connection point to the surface B.

The connection means advantageously comprise a flexible soleplate connecting the surfaces A and B.

A device of this kind may preferably be arranged close to the beads of the tire with a radial orientation D.

The distance L between the surface A and the surface B is advantageously greater than 20 mm, in order to give the device good sensitivity. In the case of a tire for heavy vehicles, this distance may be in the order of 30 mm.

The distance H, the spacing between the magnetic field generator and the passive sensor, may be between 10 and 15 mm (in the free state, or before the device is mounted on the surface of the tire).

The magnetic field generator may be a permanent magnet or an assembly of permanent magnets. This generator may also be in the form of rubber mixes including magnetic particles. The permanent magnet or magnets are preferably of the samarium-cobalt type, to ensure good performance at high temperature.

The invention also relates to a tire carrying the above device for counting rotations.

The device is preferably arranged on the inside surface of the tire. The surface A of the device may advantageously be arranged on the inner surface of one of the beads of the tire. The surface B is in this case advantageously arranged substantially radially outwards in relation to the surface A. The distance E between the surface A and the radially inward end of the inner surface of the tire may be greater than 50 mm.

It is in fact found with this arrangement that the surface A has only very small variations in profile on passing through the area of contact, while the surface B starts to have marked variations, greater than 1 mm in the case of tires for heavy vehicles. As a consequence, the variations in the distance between the magnetic field generator and the passive sensor have the same amplitude, and the device has excellent sensitivity.

The device according to the invention may also be arranged on the inner surface of the crown of the tire, such that the surfaces A and B are oriented substantially in the circumferential direction. Variations in the relative positions of the surfaces A and B and of the magnetic field generator and the passive sensor are then associated with the flattening of the crown of the tire when it passes through the area of contact.

The device according to the invention may, as another possibility, be arranged on the outside surface of the tire, at a radial height greater than the height of the rim hooks on which the tire has to be mounted, in order to avoid any problem with mounting or during travel. In this case, maintenance of the device is facilitated. It is preferable in this case to provide a device for protection, to avoid damage thereto.

The device according to the invention may furthermore include one or more of the following features:

- the device may include a signal interpreter which emits a pulse each time it detects at least one cycle of signals emitted by the passive sensor;
- the interpreter of the device may include a comparator;
- the interpreter of the device may include means for filtering the signals emitted by the passive sensor;
- the interpreter of the device may include means for amplifying signals;
- the device may include a counting means connected to the interpreter;
- the counting means of the device may include a counter which, each time it receives a predetermined number of pulses from the interpreter, transmits a pulse to a microprocessor including means for storing the number of pulses received from the counter;
- the device may include a device for transmitting to the outside data indicating the number of pulses stored by the microprocessor;
- the device may include an autonomous system of electrical power supply to the electronic components, such as a battery;
- the casing may include, in addition to the passive sensor, all the means for electrical power supply and signal processing.

The invention also relates to a device for counting the rotations of an object which undergoes deformation in the course of a rotation, comprising two parts subject to relative movement under the effect of the deformation, characterised in that the first part includes a magnetic field generator, while the second part includes a sensor sensitive to the said magnetic field.

The signals generated by the sensor as a result of the relative movement between the first part and the second part are thus associated with the deformation of the object in the course of rotation and hence allow the rotations to be counted easily.

The sensor may be in the form of a passive sensor, for example a simple coil, which allows the need to supply electrical power to the sensor to be avoided.

Similarly, the magnetic field generator may be a magnet, which also allows an electrical power supply at the generator to be avoided.

When one of the parts is connected to the object by an arm (or member), the latter may where appropriate have a certain resilience. This resilience on the one hand allows the risk of the arm breaking to be avoided, thus imparting good durability in functioning, and on the other contributes to defining a reference position about which the part concerned can be displaced. Even though this resilience can bring about a slight phase offset between the relative movement of the sensor and the magnetic field generator, on the one hand, and the deformation of the object, on the other, the frequency of the relative movement of the sensor and the magnetic field generator still corresponds to that of the deformations generated by rotation of the object and hence can still serve as the basis for counting these rotations.

In practice, the device may include an interpreter which emits a pulse each time it detects at least one cycle of signals emitted by the sensor. The interpreter includes, for example, a comparator which allows the cycles to be determined particularly simply, and which consequently consumes little power, and/or means for amplifying the signals, which is particularly advantageous when a passive sensor is used.

The device may also comprise a counter which, each time it receives a predetermined number of pulses from the interpreter, transmits a pulse to a microprocessor which includes means for storing the number of pulses received from the counter. Thus, the processor can operate for only a minimal proportion of the time of use, which also allows the electrical power consumption of the device to be reduced.

The device may furthermore include means for transmitting to the outside data indicating the number of pulses stored by microprocessor. The number of pulses stored by the microprocessor which, it goes without saying, indicates the number of rotations the object has performed, may thus be read off without making contact with another device.

The electrical power supply of the device may be provided by an autonomous system for the supply of electrical power to the electronic components (for example a battery), in particular thanks to the low power consumption of the device thanks, for example, to some at least of the features above, which allows the device to be used even in environments in which no outside electrical power supply is available.

BRIEF DESCRIPTION OF THE DRAWINGS

The invention will be more readily understood from reading the description below, which is given solely by way of example and which refers to the attached drawings, in which.

DETAILED DESCRIPTION OF THE DRAWINGS

Figure 1:
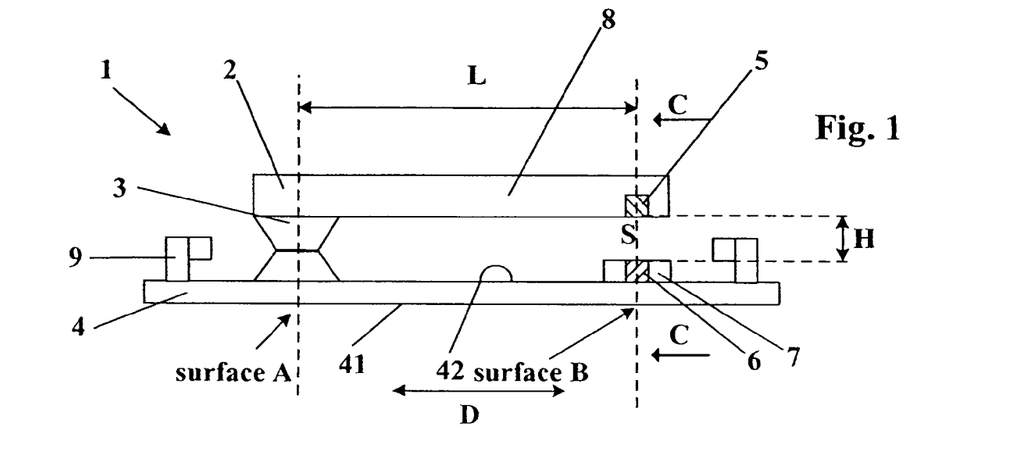
FIG. 1 is a side view of a first example embodiment of a device according to the invention.
Figure 2:
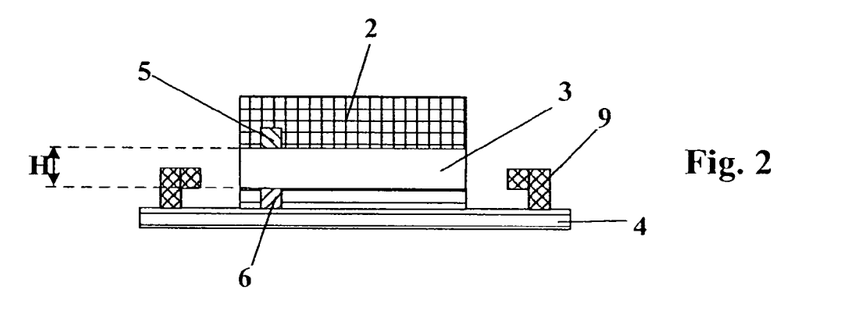
FIG. 2 is a section CC as indicated in FIG. 1 of the first example of a device according to the invention.
Figure 3:
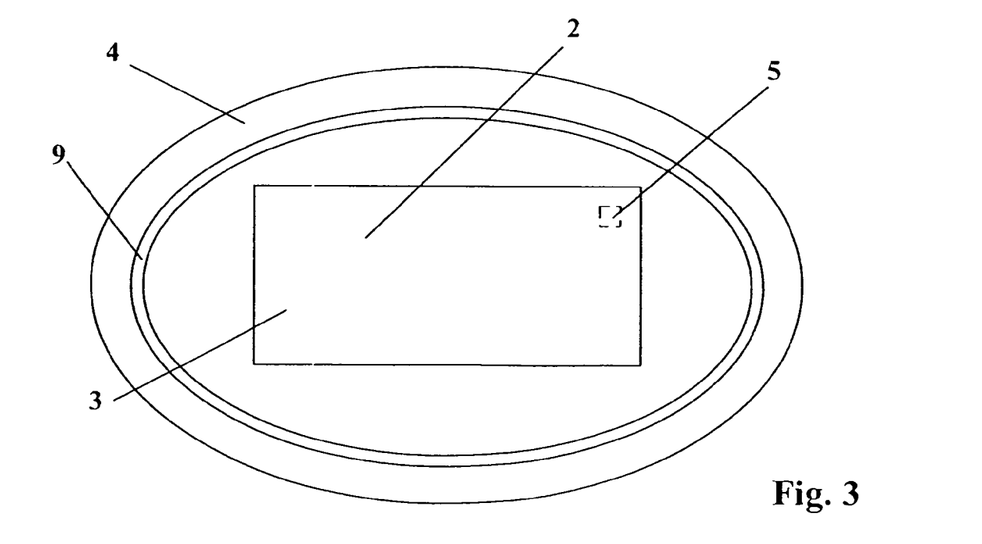
FIG. 3 is a plan view of the device in FIG. 1.

FIGS. 1, 2 and 3 illustrate a side view, a section and a plan view of a first example embodiment of a device 1 according to the invention. This device chiefly comprises a rigid casing 2, connection means 3, 4 and 7, and a sensor in the form of a passive sensor 5 and a magnet 6.

The casing 2 carries the passive sensor 5 and all the means 8 for electrical power supply and signal processing.

The connection means include a soleplate 4, an element 3 for connecting the casing 2 and an element 7 for connecting the magnet 6. The soleplate 4 has a first face 41, which is intended to be permanently connected to the surface of the tire, and a second face 42. This soleplate is advantageously made of flexible rubber, so that it can follow the deformations of the surface of the tire. The element 3 for connecting the casing 2 allows the casing 2 and the soleplate 4 to be made mechanically integral with one another, such that the casing follows all the displacements of the surface A, the zone of the soleplate adjacent to the connection element 3. This connection element 3 may also be made of rubber material, but it must be substantially harder in order to guarantee its mechanical functions of holding and making integral. The magnet 6 is embedded in the connection element 7.

The casing 2, the connection element 3 and the soleplate 4 are generally U-shaped. The passive sensor 5 is arranged at the end of one of the two arms of the U and the magnet 6 is arranged at the other end. These two elements form the sensor of the device and are arranged opposite one another in a direction normal to the direction D connecting the surfaces A and B. The sensor is offset from the connection element 3 by a length L greater than 20 mm, and in the order of 30 mm for the tires of heavy vehicles. The magnet 6 and the passive sensor 5 are separated from one another by a distance H of between 10 and 15 mm in the free state. The connection element 7 positions the magnet 6 here, projecting from the end of the soleplate 4. It may also be embedded in the soleplate 4. The magnet 6 will be able to follow all the displacements of the surface B of the soleplate 4 and the surface of the adjoining tire.

The soleplate 4 also comprises a raised kerb 9 intended to receive and fix a hood for protecting the device when it is arranged on the surface of a tire, or during any retread operations thereon. A hood of this kind may in particular be made of glass fibre reinforced plastics material.

Figure 4:
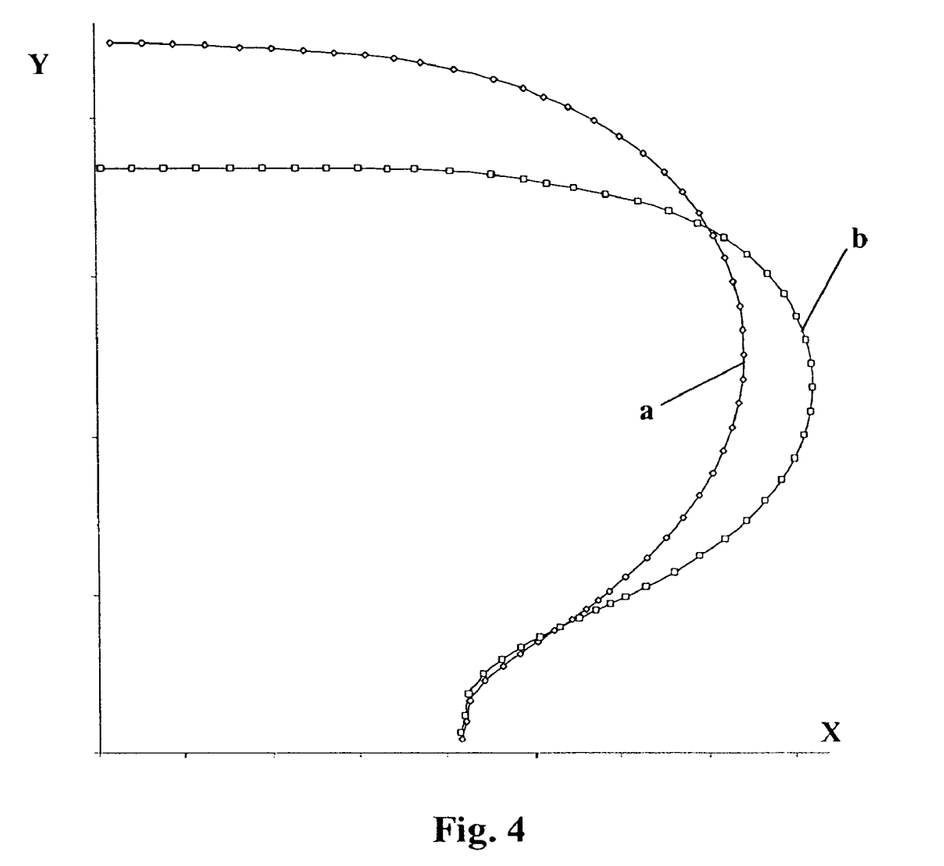
FIG. 4 shows the curve of the profile of the inner surface of a tire for the azimuths 0° (opposite the area of contact) and 180° (centre of the area of contact)

FIG. 4 shows how the mid-line profile of the inner surface of a tire for heavy vehicles, 315/80 R 22.5, changes under given conditions of loading and pressure for the azimuths 0° (opposite the area of contact—curve a) and 180° (centre of the area of contact—curve b).

It is found that there is virtually no variation in this profile, as it passes through the area of contact, over the entire zone of beads of the tire, the zone close to the bead wire and bearing on the outer side of the tire against the rim hook. By contrast, on the radially outer side the spacing between the two profiles shown continues to increase.

Figure 5:
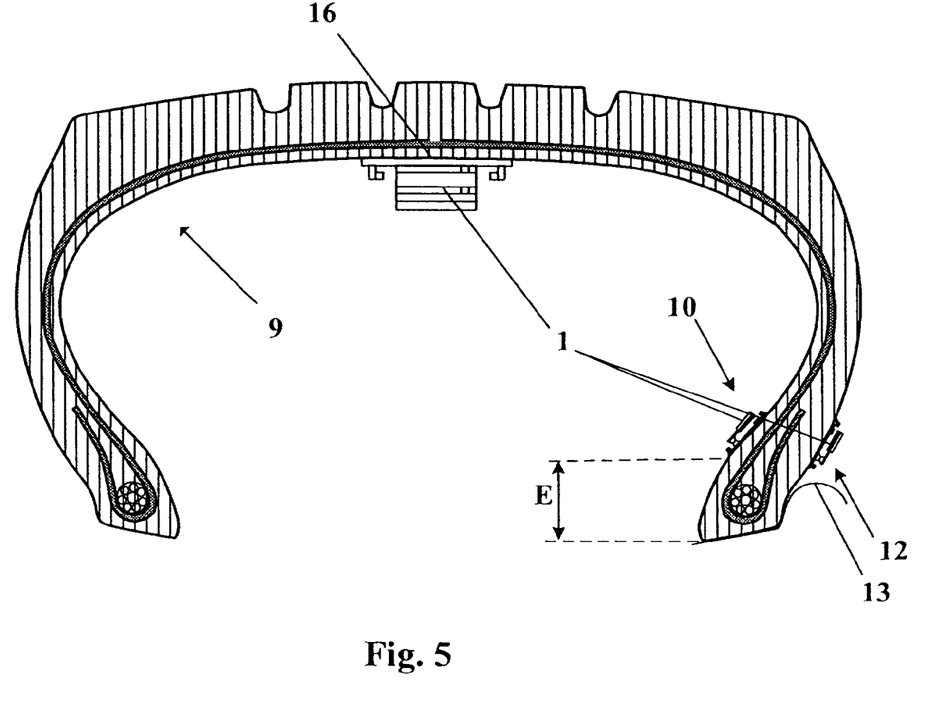
FIG. 5 is a centre line sectional view through a tire which is equipped, by way of illustration, with a plurality of devices according to the invention arranged on its inside and outside surfaces.

Thus, a first favourable position for installation of the device according to the invention is with the surface A placed adjacent to the radially outer end of the zone of beads of the tire, so that the displacements of this surface A and thus of the casing and the passive sensor are very much reduced during travel. The surface B is in this case placed on the radially outer side in relation to the surface A. This is what is shown in FIG. 5 for the device 1.

With a distance L in the order of 30 mm between the centres of the surfaces A and B, the variations in the profile and hence in the distance between the passive sensor and the magnet as they pass through the area of contact are in the order of 1 mm.

The passive sensor 5 is advantageously a coil whereof the direction of sensitivity (identical to the axis of the coil) is oriented in the direction S, normal to the direction D. The magnet is also placed with its two poles oriented in the direction S. Any variation in the distance between the magnet and the coil will thus bring about a variation in the magnetic flux passing through the coil, and emits a signal proportional to this variation, in accordance with Faraday's law and Lenz's law.

The signal generated by the coil is a periodic signal whereof the frequency is equal to the frequency at which the tire rotates.

The stronger and faster the variations in the magnetic flux passing through the coil, the larger the signal generated by the coil: its amplitude thus also depends on the speed of rotation of the coil. In a particular embodiment, the signal is integrated to obtain the value of the field and eliminate the effect of the speed.

Figure 6:
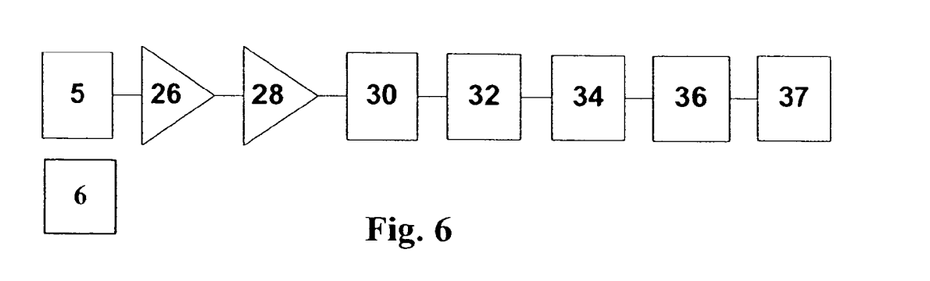
FIG. 6 is a flow diagram of a device according to the invention.

FIG. 6 is a flow chart of a particular embodiment of a device according to the invention. The device 1 is composed of a sensor with a passive sensor 5 (a coil having an impedance of 2.2 mH) and a magnet 6 of 100 mm$^3$, an amplifier 26 allowing the signals emitted by the passive sensor to be amplified if necessary, a filter 28 allowing interference frequencies to be suppressed and alternative external sources of magnetic field which create interference to be rejected (e.g. 50 Hz on the mains network), and a comparator 30 which generates a rectangular pulse on each rotation of the tire. The amplifier 26, the filter 28 and the comparator 30 form a signal interpreter. The device furthermore comprises an N-bit counter 32 which stores the number of rotations performed by the tire and which, when it is full (every $2^N$ rotations), triggers a microprocessor 34 which increments its memory by one, for example. The counter 32 and the microprocessor 34 form a counting means. Finally, the device includes an output device 36 which allows data indicating the number of pulses counted by the microprocessor 34 to be transmitted to the outside. The electronics include a battery 37.

The dimensions of the casing are approximately 50 mm×20 mm. The total height of the device is approximately 20 mm and its weight is in the order of 20 g.

Figure 7:
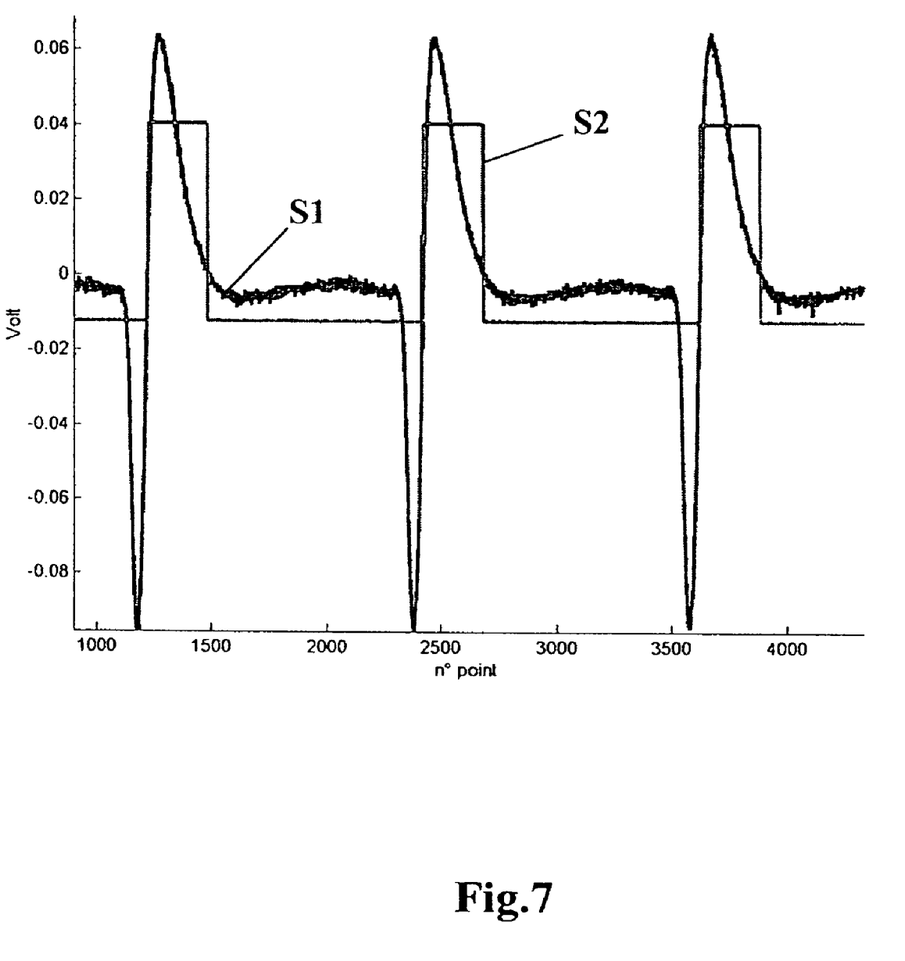
FIG. 7 is a graph showing the signals emitted over time by the sensor of a device according to the invention.

FIG. 7 shows the signals S1 and S2 supplied by the device according to the invention over three wheel rotations under the following test conditions: inflation pressure 6 bar, load 35000 N and speed 10 km/h, with tire 315/80 R 22.5 (a tire for heavy vehicles). The signal S1 is the output signal from the amplifier 26 and the signal S2 is the output signal from the comparator 30.

It is found that passing through the area of contact is shown, in the output from the amplifier 26, as a first peak of negative amplitude followed by a second of positive amplitude. At the output of the interpreter, the signals comprise only a single pulse (S2), corresponding to each wheel rotation.

A test was carried out with a device of this kind glued to the inner surface of the bead of a tire mounted on the driving axle of a load-bearing vehicle MAN 14. The kilometers measured correspond to the kilometers covered, within 5%. The information on kilometers is obtained from radio interrogation via a manual reader close to the tire, at the rear of the vehicle. It is thus possible to transmit the results to the driver's cab and to display them.

FIG. 5 shows, in addition to the position in the zone 10 which has already been described, two other possible positions in which a device according to the invention may be fixed to the surface of the tire 9. The first of these consists in fixing the device 1 to the outer surface of the tire in a zone 12, substantially at the same radial height on the tire side. A minimum height above the height of the rim hook 13 of the tire should be observed, to avoid any risk of damage on mounting or during travel. It is preferable to add a device for protecting the device, to limit the risk of shock during travel. The advantage of this position is that it makes maintenance and monitoring of the device easier.

Another position is below the crown of the tire, in a zone 16. The two arms of the U of the device 1 are in this case arranged in a circumferential direction. The variations in distance between the magnet and the coil are linked to the flattening of the crown as it passes through the area of contact.

Figure 8:
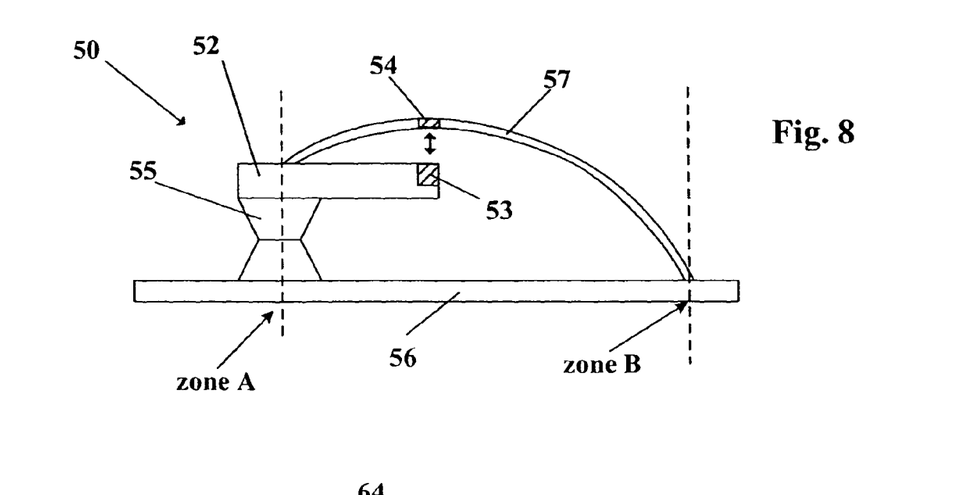
FIG. 8 is a side view of a second example embodiment of a device according to the invention.

FIG. 8 shows a second embodiment of a device according to the invention. In this embodiment, the device 50 comprises, as above, a casing 52, a sensor with a coil 53 and a magnet 54, an element 55 for connecting the casing 52, an element 57 for connecting the magnet 54 and a soleplate 56. The connection element 57 is arcuate and elongate in shape and extends from the surface of the soleplate 56 adjoining the surface B to the surface of the casing 52 on the opposite side of the soleplate 56. As a consequence, any relative displacement of the surfaces A and B will bring about a relative displacement of the magnet and the coil which is directed in a direction substantially perpendicular to the direction D. This device 50 has the advantage of allowing the surfaces A and B to be separated from one another and thus to increase the amplitude of relative movements between the two elements of the sensor.

Figure 9:
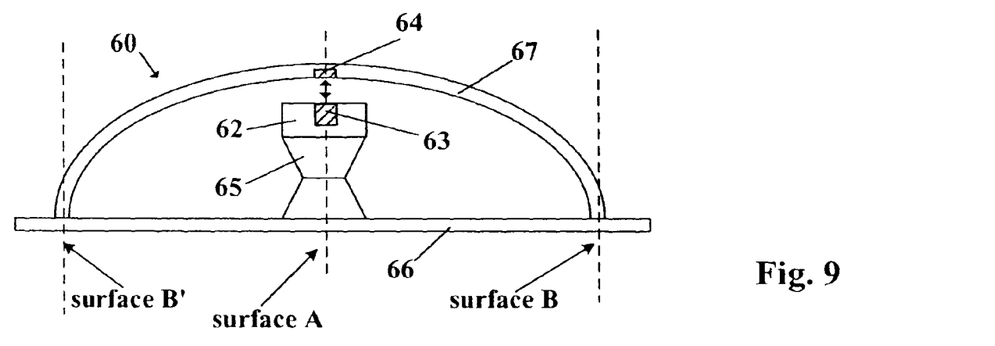
FIG. 9 is a side view of a third example embodiment of a device according to the invention.

FIG. 9 shows a third embodiment of a device according to the invention. This device 60 comprises, as above, a casing 62, a sensor with a coil 63 and a magnet 64, an element 65 for connecting the casing 62, an element 67 for connecting the magnet 64 and a soleplate 66. The connection element 67 is arcuate and elongate in shape and extends from the surface of the soleplate 56 adjoining the surface B to a surface B' arranged symmetrically in relation to the surface B on the other side of the casing 62. The result is that the relative movements between the two elements of the sensor are associated with the relative displacements between the surfaces A and B and between A and B'. In certain conditions, for example when the device 60 is arranged on the inner surface of the tire below the crown, this allows the sensitivity of the device for counting the rotations of the tire to be increased. In this case, the device is preferably arranged with the direction D oriented in the circumferential direction.

Figure 10:
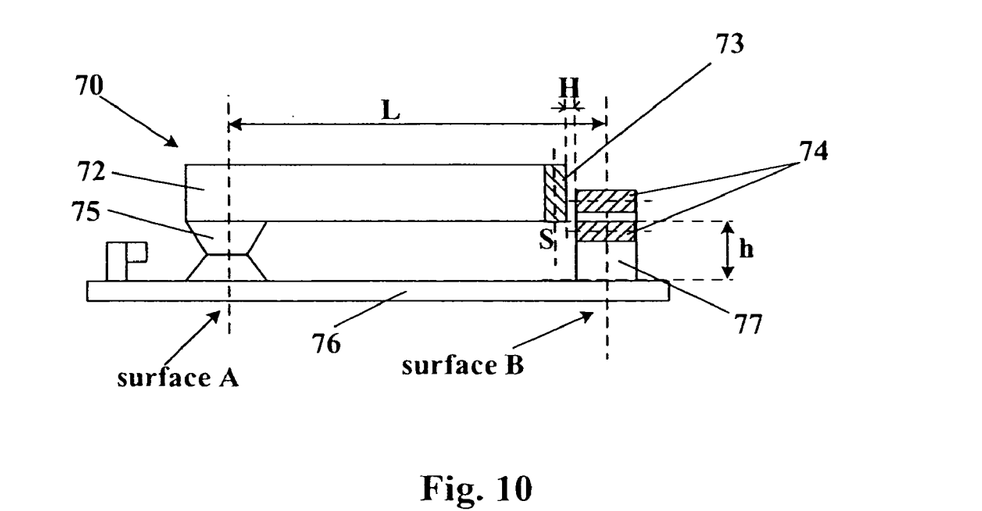
FIG. 10 is a side view of a fourth example embodiment of a device according to the invention.

FIG. 10 shows a fourth embodiment of a device according to the invention. In this embodiment, the device 70 comprises, as above, a casing 72, a sensor with a coil 73 and a magnetic field generator 74, an element 75 for connecting the casing 72, an element 77 for connecting the generator 74 and a soleplate 76. The element 77 for connecting the generator 74 separates these parts from the soleplate 76 by an average height of h, such that this generator is opposite the coil 73. The generator of this device 70 is in the form of one or more magnets 74 arranged opposite the coil 73, but in a direction parallel to the direction D instead of perpendicular thereto as before.

As previously, the directions in which the magnets and the coil are sensitive are oriented in a manner normal to the direction D. Any variation in the relative positions of the magnets and the coil will also bring about an electrical signal in the coil 73.

Figure 11:
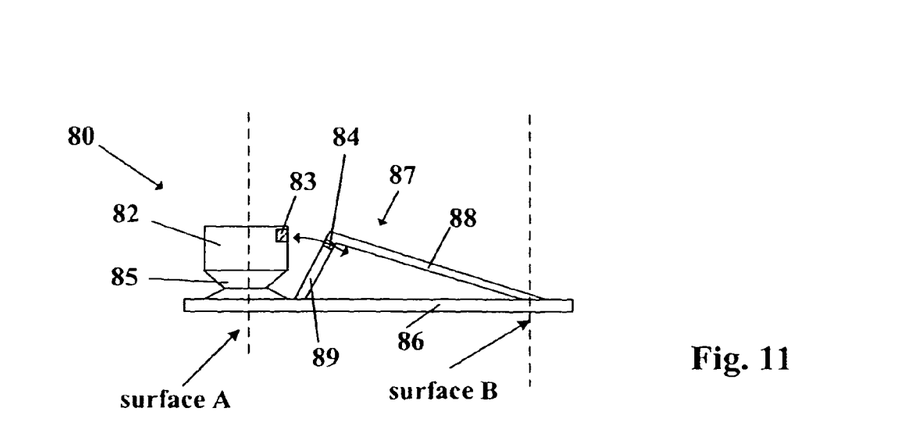
FIG. 11 is a side view of a fifth example embodiment of a device according to the invention.

FIG. 11 shows a fifth embodiment of a device 80 according to the invention. In this embodiment, the device 80 comprises, as above, a casing 82, a sensor with a coil 83 and a magnetic field generator 84, an element 85 for connecting the casing 82, an element 87 for connecting the generator 84 and a soleplate 86. The element 87 for connecting the magnetic field generator 84 is in the form of two elongate arms 88 and 89 with a connection point 90, in the shape of an L. The generator 84 is arranged substantially at the connection point 90, the first arm extends from the connection point 90 to a zone of the soleplate substantially adjoining the surface A and the second arm 89 extends from the connection point 90 to the surface B. As a consequence, any relative displacement normal to the direction D of the surfaces A and B brings about a relative displacement of the passive sensor 83 and the magnetic field generator 84 substantially parallel to the direction D.

The embodiments described above have been given purely by way of non-restrictive examples, and may be the subject of any desirable modifications without in so doing departing from the scope of the invention.

The invention claimed is:

1. A device for counting rotations of an object undergoing deformation during a rotation, comprising:
   two parts subject to relative movement under effect of the deformation, the first part including a magnetic field generator and the second part including a sensor sensitive to a magnetic field generated by the magnetic field generator;
   connection means mechanically connecting the second part to a first surface of the object and connecting the first part to a second surface of the object, the first and second surfaces of the object being offset from one another;
   an interpreter configured to emit a pulse each time said device detects at least one cycle of signals emitted by the sensor sensitive to the magnetic field generated by the magnetic field generator; and
   counting means connected to the interpreter.

2. The device according to claim 1, wherein the sensor is a passive sensor.

3. The device according to claim 1, wherein the magnetic field generator is a magnet.

4. The device according to claim 1, wherein one of the two parts is connected to the object by a resilient member.

5. The device according to claim 4, wherein the resilient member contributes to defining a reference position of the sensor in relation to the magnetic field generator.

6. The device according to claim 1, wherein the interpreter comprises a comparator.

7. The device according to claim 1, wherein the interpreter comprises means for amplifying signals.

8. The device according to claim 1, wherein the counting means comprises a counter which, each time said counter receives a predetermined number of pulses from the interpreter, transmits a pulse to a microprocessor including means for storing a number of pulses received from the counter.

9. The device according to claim 8, further comprising
   means for transmitting to an outside data indicating the number of pulses stored by the microprocessor.

10. The device according to claim 1, further comprising:
    an autonomous system of electrical power supply to the electrical components.

11. A tire equipped with the device according to claim 1.

12. The tire according to claim 11, wherein the first surface is arranged on an inner surface bead of the tire.

13. The tire according to claim 12, wherein the second surface is arranged substantially radially outwards in relation to the first surface.

14. The tire according to claim 12, wherein the first surface is arranged at a spacing greater than 50 mm from a radially inward end of the inner surface of the tire.

15. The tire according to claim 11, wherein the device is arranged on an inner surface of a crown of the tire, and wherein the first and second surfaces are oriented substantially in a circumferential direction.

16. The tire according to claim 11 wherein the tire is mountable on a rim having rim hooks of a given height and the device is arranged on an outer surface of one sidewall of the tire, at a radial distance greater than the given height of the rim hooks.

17. A device for counting rotations of a tire on a vehicle using deformations that the tire undergoes on each rotation of a wheel, comprising
   a casing;
   a sensor configured to generate an electrical signal on each rotation of the wheel; and
   connection means for mechanically connecting the casing and the sensor to a surface of the tire;
   wherein the sensor comprises
      a magnetic field generator, and
      a sensor sensitive to a magnetic field and in one piece with the casing, arranged opposite the magnetic field generators;
   wherein said connection means mechanically connect the casing to a first surface and the magnetic field generator to a second surface B, the first and second surfaces being substantially coplanar and offset from one another in a direction by a given distance L; and
   wherein said electrical signal is produced by relative displacements of said magnetic field generator and the sensor sensitive to the magnetic field.

18. The device according to claim 17, wherein the sensor sensitive to the magnetic field is a passive sensor.

19. The device according to claim 18, wherein the passive sensor is a loop of conductive wire.

20. The device according to claim 17, wherein the connection means are arranged such that a relative displacement normal to the direction of the first and second surfaces causes a relative displacement of the magnetic field generator and the sensor substantially normal to the direction.

21. The device according to claim 20, wherein the magnetic field generator and the sensor sensitive to the magnetic field are arranged in opposition in a direction normal to the direction.

22. The device according to claim 21, wherein the connection means, the casing and the sensor sensitive to the magnetic field are arranged in an L shape.

23. The device according to claim 22, wherein the connection means and the sensor comprise a flexible soleplate having a first face configured for permanent connection to a surface of the tire and at least one connection element to which the casing is fixed at a given spacing in relation to the flexible soleplate.

24. The device according to claim 23, wherein the magnetic field generator is embedded in the soleplate.

25. The device according to claim 23, wherein the casing, the element for connecting the casing, and the soleplate are generally U-shaped.

26. The device according to claim 21, wherein the connection means for connecting the magnetic field generator comprises a resilient connection element of arcuate elongate shape extending in the direction between the second surface and a zone of the casing or element for connecting the casing which is opposite the first surface, the magnetic field generator and the sensor sensitive to the magnetic field being arranged in opposition between two ends of the element for connecting the sensor.

27. The device according to claim 26, wherein the connection means comprise a flexible soleplate connecting the first and second surfaces.

28. The device according to claim 21, wherein the connection means for connecting the magnetic field generator comprises a resilient connection element of arcuate elongate shape extending in the direction between the second surface and another surface arranged beyond the first surface, the magnetic field generator and the sensor sensitive to the magnetic field being arranged in opposition between two ends of the resilient connection element for connecting the magnetic field generator.

29. The device according to claim 28, wherein the connection means comprise a flexible soleplate connecting the first, second and other surfaces.

30. The device according to claim 20, wherein the magnetic field generator and the sensor sensitive to the magnetic field are arranged in opposition in a direction parallel to the direction.

31. The device according to claim 30, wherein the connection means comprise an element for connecting the casing separating the casing from the first surface by a given height and an element connecting the magnetic field generator separating the magnetic field generator from the second surface by a given height, and wherein the sensor sensitive to the magnetic field is in one piece with the casing and is arranged at a height in relation to the first surface which is substantially identical to a height separating the magnetic field generator from the second surface.

32. The device according to claim 17, wherein the connection means are arranged such that a relative displacement normal to the direction of the first and second surfaces causes a relative displacement of the sensor sensitive to the magnetic field and the magnetic field generator substantially parallel to the direction.

33. The device according to claim 32, wherein the connection means for connecting the magnetic field generator comprise two elongate arms with a connection point in an L shape, such that the magnetic field generator is arranged substantially at the connection point, a first arm of the two elongate arms extends from the connection point to an adjoining zone substantially on the first surface and a second arm of the two elongate arms extends from the connection point to the second surface.

34. The device according to claim 33, wherein the connection means comprise a flexible soleplate connecting the first and second surfaces.

35. The device according to claim 17, wherein a distance L between the first surface and the second surface is greater than 20 mm.

36. The device according to claim 17, wherein a distance separating the magnetic field generator and the sensor sensitive to the magnetic field is between 10 and 15 mm in a free state.

37. The device according to claim 17, wherein the magnetic field generator is a rubber mix including magnetic particles.

38. The device according to claim 17, wherein the magnetic field generator is a permanent samarium-cobalt magnet.

39. The device according to claim 17, further comprising:
an interpreter which emits a pulse each time the interpreter detects at least one cycle of signals emitted by the sensor sensitive to the magnetic field.

40. The device according to claim 39, wherein the interpreter includes a comparator.

41. The device according to one of claim 39, wherein the interpreter includes means for filtering the signals emitted by the sensor sensitive to the magnetic field.

42. The device according to claim 39, wherein the interpreter includes means for amplifying signals.

43. The device according to claim 39, further comprising:
a counting means connected to the interpreter.

44. The device according to claim 43, wherein the counting means comprises a counter which, each time the counter receives a predetermined number of pulses from the interpreter, transmits a pulse to a microprocessor including means for storing a number of pulses received from the counter.

45. The device according to claim 44, further comprising:
a device for transmitting data indicating the number of pulses stored by the microprocessor.

46. The device according to claim 39, further comprising:
an autonomous electrical power supply system configured to supply power to the electronic components.

47. The device according to claim 17, wherein the casing is a printed circuit carrying, in addition to the passive sensor, means for supplying electrical power and signal processing.

48. A tire equipped with the device according to claim 17.

* * * * *